United States Patent
O'Connor

(10) Patent No.: US 7,309,095 B2
(45) Date of Patent: Dec. 18, 2007

(54) SEAT ASSEMBLY WITH A RELEASE SYSTEM

(75) Inventor: James G. O'Connor, Oxford, MI (US)

(73) Assignee: Lear Corporation, Southfield, MI (US)

( * ) Notice: Subject to any disclaimer, the term of this patent is extended or adjusted under 35 U.S.C. 154(b) by 211 days.

(21) Appl. No.: 11/162,304

(22) Filed: Sep. 6, 2005

(65) Prior Publication Data

US 2007/0052255 A1   Mar. 8, 2007

(51) Int. Cl.
*B60N 2/02* (2006.01)
(52) U.S. Cl. .............. 296/65.03; 296/65.01; 297/344.1; 297/344.21; 297/344.25
(58) Field of Classification Search ........... 296/65.03, 296/65.01, 63; 297/344.1, 344.21, 33.25, 297/344.25
See application file for complete search history.

(56) References Cited

U.S. PATENT DOCUMENTS

| | | | |
|---|---|---|---|
| 4,169,626 A | 10/1979 | Hollar, Jr. | |
| 4,178,037 A | 12/1979 | Pickles | |
| 4,384,744 A | 5/1983 | Barley | |
| 5,280,987 A | 1/1994 | Miller | |
| 5,364,152 A | 11/1994 | Mastrangelo et al. | |
| 5,634,686 A | 6/1997 | Okazaki | |
| 5,662,368 A | 9/1997 | Ito et al. | |
| 5,810,443 A | 9/1998 | Blanchard | |
| 5,871,255 A | 2/1999 | Harland et al. | |
| 5,961,183 A | 10/1999 | Smith et al. | |
| 6,000,742 A | 12/1999 | Schaefer et al. | |
| 6,065,804 A | 5/2000 | Tanaka et al. | |
| 6,250,704 B1 | 6/2001 | Garrido | |
| 6,345,867 B1 | 2/2002 | Hellrung et al. | |
| 6,478,358 B1 | 11/2002 | Okazaki et al. | |
| 6,761,408 B2 | 7/2004 | Lim et al. | |
| 6,860,560 B2 | 3/2005 | Chiu et al. | |
| 6,869,143 B2 | 3/2005 | Secord | |
| 6,883,869 B2 | 4/2005 | Liu et al. | |
| 2005/0046261 A1 | 3/2005 | Grable et al. | |
| 2006/0006687 A1* | 1/2006 | Jeong ............ | 296/65.03 |

* cited by examiner

*Primary Examiner*—Lori L. Lyjak
(74) *Attorney, Agent, or Firm*—Brooks Kushman P.C.

(57) ABSTRACT

A release actuating system 10 for a seat assembly 12 in a vehicle. Conventionally, the system includes a seat back 14 that is removable through an arcuate range. The seat back 14 is moveable between a design position (tilted upward and rearwardly) in which it may support a passenger, and a full fold flat position. Seat back latches 24 secure the seat back 14 in the design position. A seat cushion 32 supports the seat back 14. The seat cushion 32 has a rearward portion that cooperates with the seat back 14. The rearward portion also releasably engages floor latches 26. The seat cushion 32 has a forward portion that is pivotally attached to the vehicle floor. The seat cushion 32 and seat back 14 tumble forwardly when (a) the seat back latches 24 are disengaged; (b) the seat back 14 lies in the full fold flat position; and (c) the floor latches 26 are disengaged. The tumble forward position facilitates occupant ingress and egress and provides access to luggage and storage areas. In operative communication with the seat back latches 24 and floor latches 26, there is provided a release strap 23 and a pair of gears for releasing these latches. The invention also includes a method for actuating a release system for the seat assembly.

8 Claims, 4 Drawing Sheets

US 7,309,095 B2

SEAT ASSEMBLY WITH A RELEASE SYSTEM

BACKGROUND OF THE INVENTION

1. Field of the Invention

The invention relates to release system for a seat assembly in which the system includes gears which are actuated by a lever that is moved by a pull strap.

2. Background Art

Conventionally, seat assemblies include: (1) a seat back that is moveable over an arcuate range between a design position in which it may support a passenger's upper body (either upright or reclined) and a full fold flat position; (2) inboard and outboard seat back latches for releasably securing the seat back in the design position; (3) inboard and outboard floor latches; and (4) a seat cushion that supports the seat back. The rearward portion of the seat cushion engages the floor latches. The seat cushion has a forward portion that is pivotally attached to the vehicle floor so that the seat cushion and seat back may tumble forwardly. This movement occurs when (1) the seat back latches are disengaged; (2) the seat back lies in the full fold flat position; and (3) when the floor latches are disengaged. The tumbled position facilitates occupant ingress and egress and provides better access to luggage and storage spaces.

Among the references identified in a search that was conducted before filing this application are the following U.S. patents and published application: U.S. Pat. Nos. 6,883,869; 6,869,143; 6,860,560; 6,761,408; 6,478,358; 6,345,867; 6,250,704; 6,065,804; 6,000,742; 5,961,183; 5,871,255; 5,810,443; 5,662,368; 5,634,686; 5,364,152; 5,280,987; 4,384,744; 4,178,037; 4,169,626; 2005/0046261.

SUMMARY OF THE INVENTION

Against this background, it would be desirable to make available to the vehicle user a seat fold and tumble feature which is released and activated by a pull strap that is linked to a gear combination. Preferably, the feature would be operable with minimal force exerted by an operator.

Further, it would be desirable if the system for releasing the seat back and floor latches were conveniently positioned at the rear of a seat so that the system can be operated by a rear seat passenger.

More specifically, it would be desirable to provide release via gears that would cause the seat back to be folded and the seat tumbled forwardly.

To fulfill these and related objects, the present invention discloses a release actuating system for a seat assembly in a vehicle. Conventionally, the system includes a seat back that is movable through a limited arcuate range about an axis positioned toward a lower portion of the seat back. The seat back is moveable between a design position (tilted upwardly and rearwardly), in which it may support a passenger, and a full fold flat position.

A pair of seat back latches secures the seat back in the design position. A seat cushion supports the seat back. The seat cushion has a rearward portion that cooperates with the seat back. The rearward portion also releasably engages the floor latches. The seat cushion has a forward portion that is pivotally attached to the vehicle floor. The seat cushion and seat back may tumble forwardly when (1) the seat back latches are disengaged; (2) the seat back lies in the full fold flat position; and (3) both of the floor latches are disengaged. The tumble forward position facilitates occupant ingress and egress and provides access to luggage and storage areas.

DETAILED DESCRIPTION OF THE PREFERRED EMBODIMENT(S)

Figure 1:
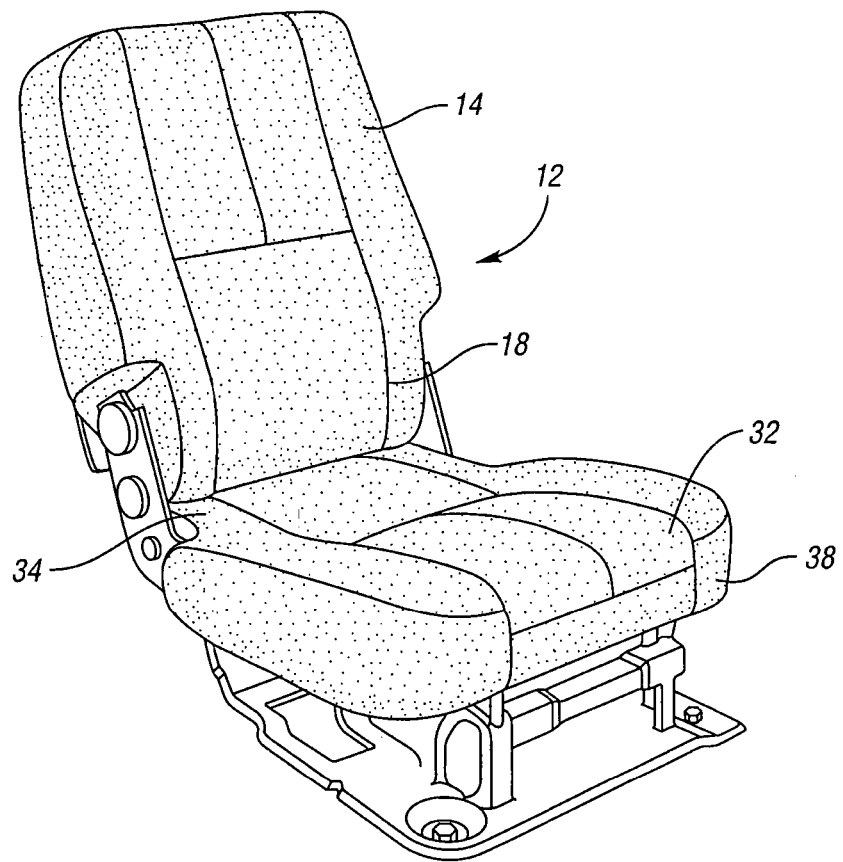
FIG. 1 is a quartering perspective view of a seat assembly illustrated as a seat back and seat cushion oriented in a position that is effective to support a vehicle occupant.
Figure 2:
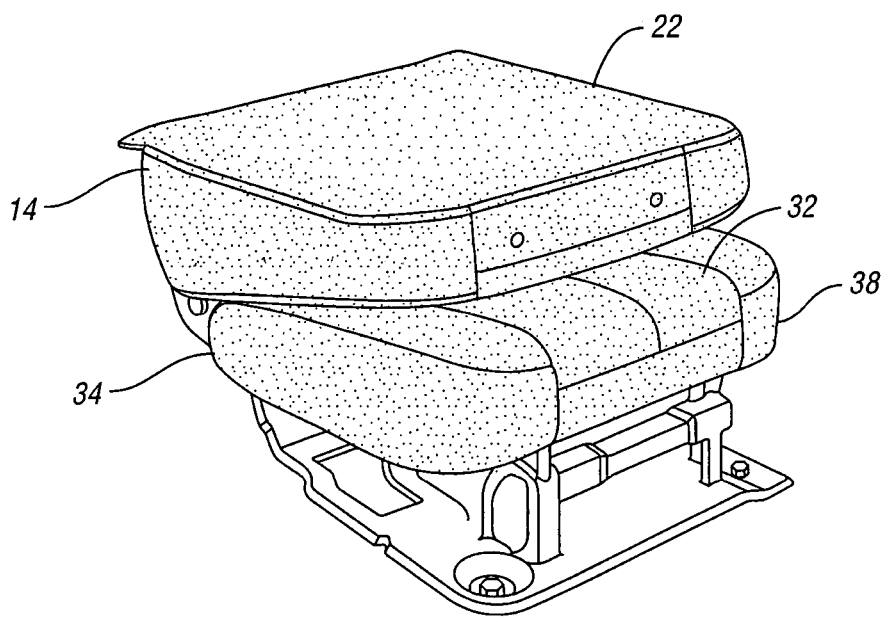
FIG. 2 is a quartering perspective view of the seat assembly in which the seat back lies in a fold flat position.

FIGS. 1-7 depict a release actuating system 10 for a seat assembly 12 in a vehicle. The system includes a seat back 14 (FIG. 1) that is moveable through a limited arcuate range about an axis A-A located toward a lower portion 18 of the seat back 14. The seat back 14 is moveable between a design position (either upright or tilted rearwardly)—in which it may support an occupant—and a full fold flat position 22 (FIG. 2).

Figure 4:
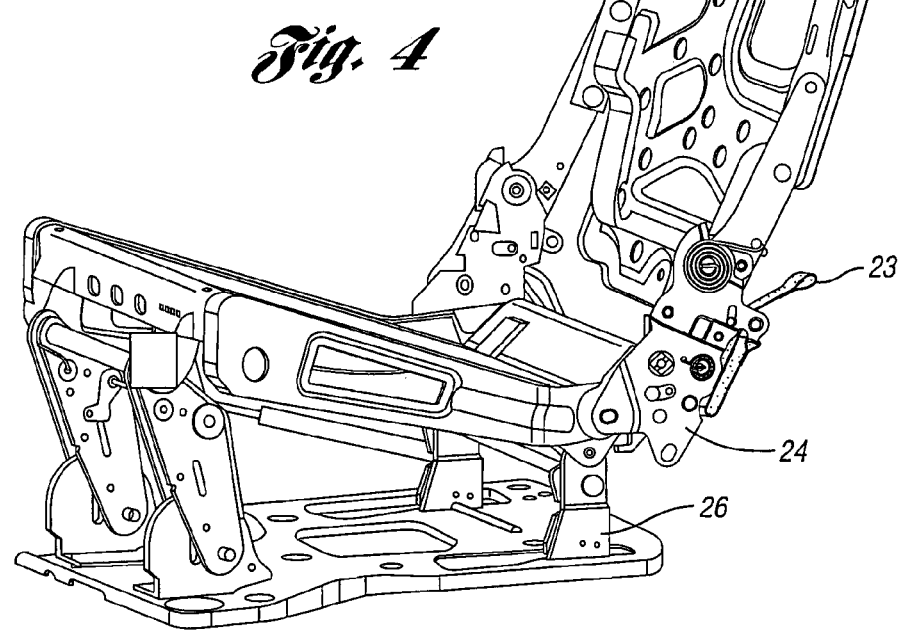
FIG. 4 is a diagram of the interior seat assembly in the design position.

As illustrated in FIG. 4, a release strap 23 opens via a linkage (to be described in more detail) a pair of seat back latches 24. These latches 24 are operatively connected to the seat assembly. They releasably secure the seat back 14 in the design position. Each seat back latch 24 also performs other functions, to be described later.

A seat cushion 32 (FIG. 1) supports the seat back 14. The seat cushion 32 has a rearward portion 34 that cooperates with the seat back 14. The seat cushion 32 has associated floor latches 26 (FIG. 4). Each has an open and a closed position. Although depicted as being associated with the seat cushion 32, the floor latches 26 may also be associated with a bracket or member that extends from the seat cushion. The floor latches 26 may extend from the vehicle floor or a tracking system affixed to the floor.

Figure 3:
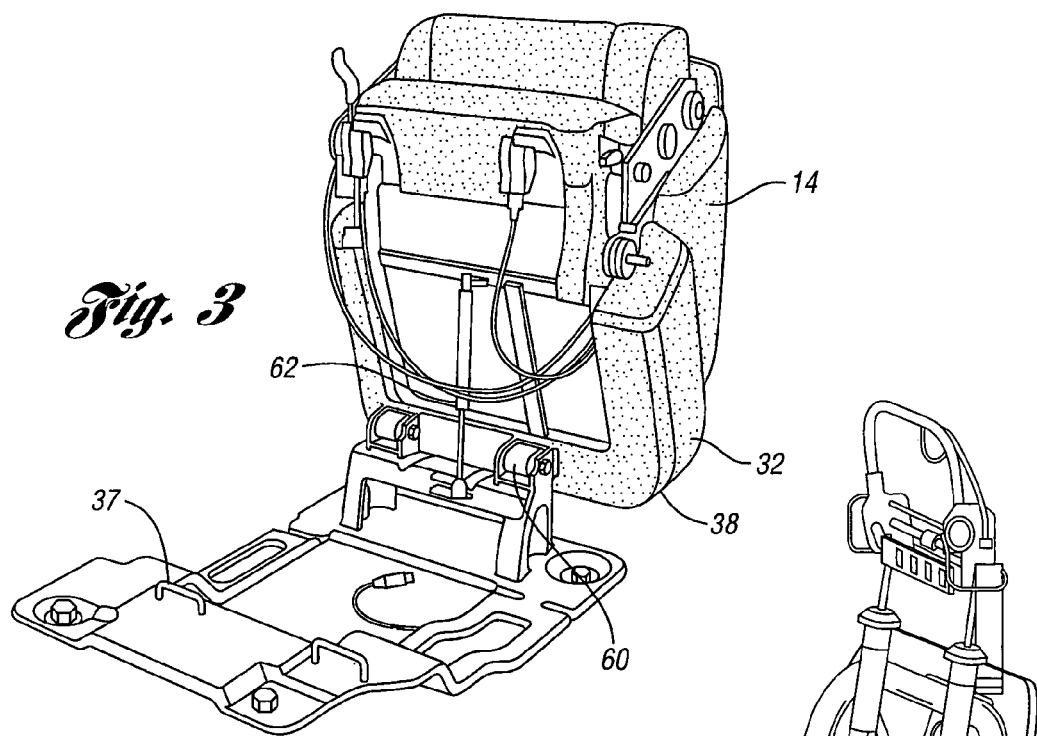
FIG. 3 is a quartering perspective view taken from the rear of the seat assembly, in which the seat cushion and seat back lie in a tumbled position.

When the floor latches 26 engage floor-mounted stanchions or strikers 37 (FIG. 3), the seat cushion 32 becomes rigidly secured to the vehicle floor. The seat cushion 32 has a forward portion 38 that is pivotally attached to the floor about a pivot axis B-B (FIG. 1). When a related control is released under conditions to be described, the seat cushion 32 and seat back 14 may tumble forwardly (as shown in FIG. 3). For this position to be achieved, the seat back latches 24 are disengaged, the seat back 14 lies in the full fold flat position (FIG. 2), and the floor latches 26 are disengaged (FIG. 4). In the tumbled position, occupant ingress and egress are facilitated, as is access to stowage and luggage areas.

Thus, the seat recliner mechanism disclosed incorporates a rotatable seat back 14 which is slaved to the floor latch releases 26. This prevents the seat back from being rotated from a folded position to a rearward/upward use position unless the floor latches are engaged. One such approach is disclosed in a pending commonly owned U.S. patent application entitled "Seat Recliner Mechanism Incorporating A Rotatable Seat back Slaved To A Floor Latch Release" that was filed on Aug. 27, 2003 under application Ser. No. 10/649,120, which is incorporated herein by reference. Related disclosures appear in commonly owned U.S. Ser. No. 10/904,203 entitled "Remote Release Actuating System For A Seat Assembly" that was filed on Oct. 28, 2004 and U.S. Ser. No. 11/126,870 entitled "Vehicle Seat Release Assembly" that was filed on May 11, 2005, which also are incorporated here by reference.

In one embodiment, the release strap 23 is located at or is accessible from the rear of a seat back 14. When pulled, it ultimately releases the seat back latches 34 and floor latches 26. Generally stated, the release strap 23 (FIG. 5) actuates a lever 25 that dumps the seat back and tumbles the seat to a folded position (FIG. 5).

Figure 5:
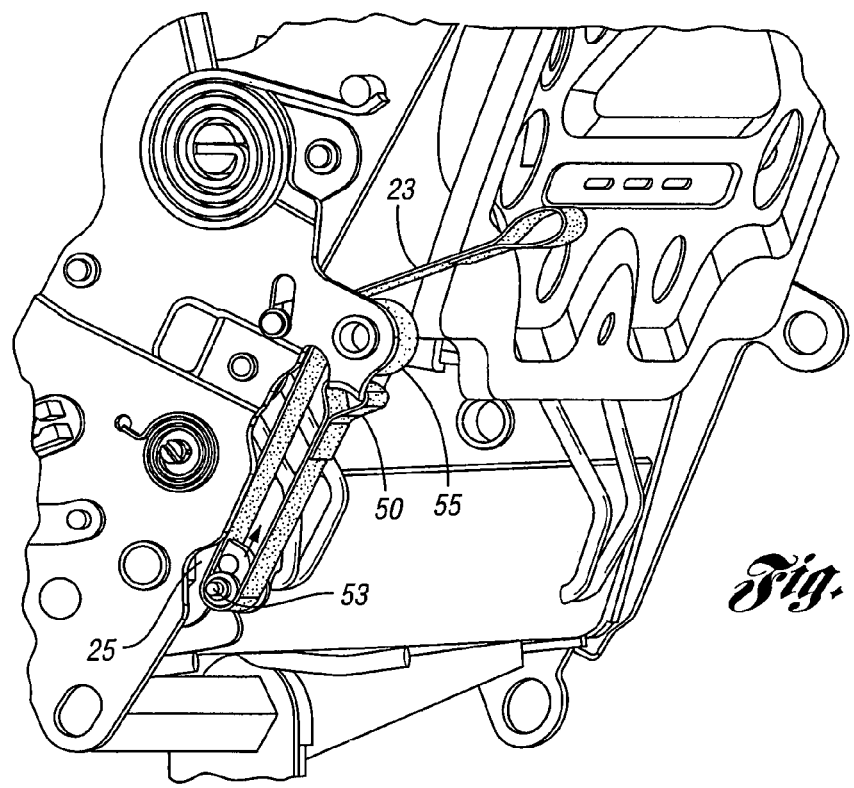
FIG. 5 is a rear perspective view of a seat recliner assembly, illustrating a lever associated with a pull strap that dumps the seat back and tumbles the seat from the folded position.

In FIG. 5, the release strap 23 is depicted as having an anchored end 50. The strap 23 can be anchored to a seat frame member by any conventional means, such as a loop that passes around a hook, as depicted. The strap then passes over a lower guide roll 53 that (preferably) rotatably extends from a fixed post which is rigidly associated with one end region of the lever 25. The release strap 23 then travels upwardly across an upward guide roll 55 that extends from the seat frame. When an operator wishes to dump the seat back to its full fold flat position (FIG. 2) and tumble the seat forwardly (FIG. 3), an operator exerts a pulling force upon the strap 23. The strap returns to its initial position soon after the pulling force is removed.

Figure 6:
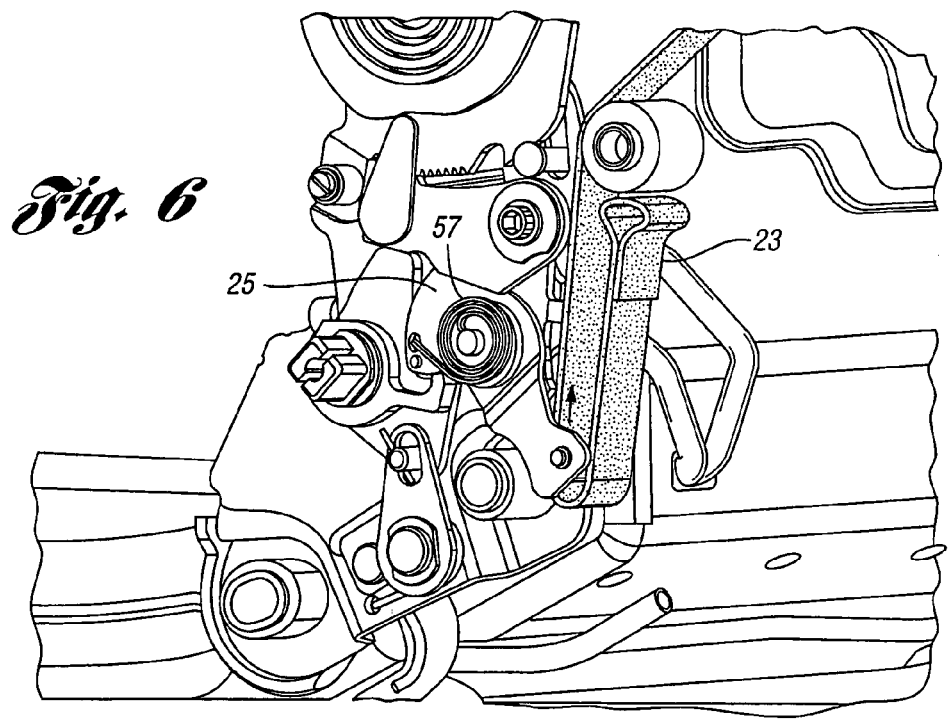
FIG. 6 is a view of the recliner internal components in isolation from their surroundings.
Figure 7:
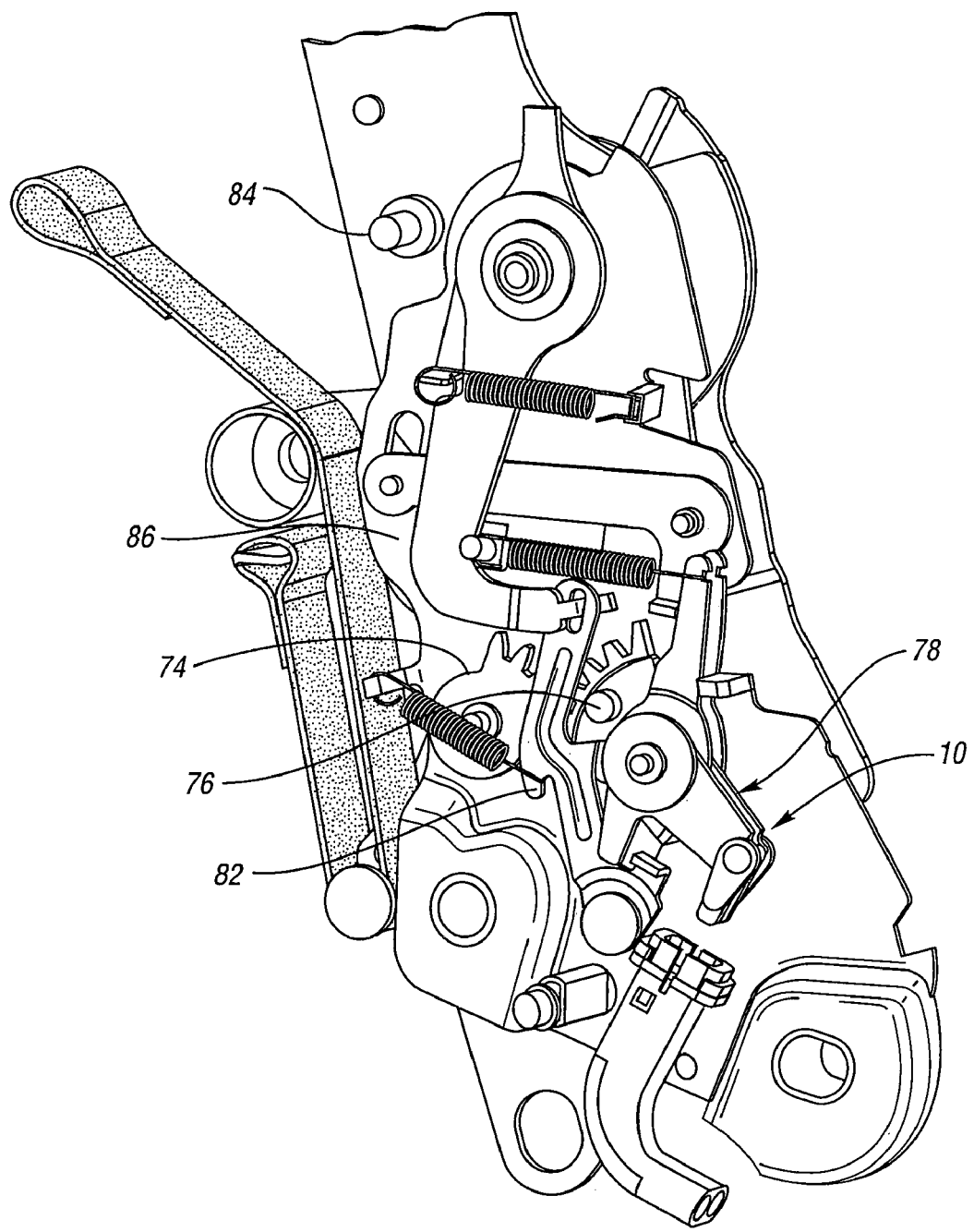
FIG. 7 is a view of the recliner internal components taken from the opposite side of FIG. 6.

FIG. 6 is a view of the recliner's internal components. When the strap 23 is pulled, it actuates the lever 25. That lever is keyed to a shaft 57. FIG. 7 depicts a view of the recliner from an opposite side from that of FIG. 6. The rear gear 74 is keyed on the same shaft 57 as the lever 25 (FIGS. 5-6). The rear gear 74 rotates with the lever 25. The rear gear 74 drives the front gear 76. Sufficient rotation of the front gear 76 causes rotation of the arm 78 which in turn actuates a cable that releases the floor latches 26. When this occurs, the seat assembly may assume its tumbled position (FIG. 3).

In operation, the release actuating system 10 sequentially releases first each seat back latch 24 and then each floor latch 26. When these latches are released, the seat back 14 is allowed to fold flat atop the seat cushion 32. There, in combination, the seat cushion 32 and folded seat back 14 tumble forwardly together about axis B-B (FIG. 1).

This tumble motion occurs under the influence of torsion springs 60 at the seat tumble pivots along the axis B-B (FIG. 1) and optionally a gas strut 62 (FIG. 3). Together, the torsion springs 60 and gas strut 62 co-operate to modulate and dampen the seat tumble movement.

FIG. 7 illustrates the modus operandi in additional detail. The rear gear 76 is keyed on the same shaft as the lever 25 (FIG. 6). The rear gear 74 (FIG. 7) drives the front gear 76. Sufficient rotation of the front gear 76 causes rotation of the floor latch release lever 78 which in turn actuates a cable to release the floor latches 26, thereby allowing the seat to assume the tumbled position.

The seat back must be in the fold-flat position before the floor latch is released. The pin on front gear 76 must clear the pocket on the interlock lever 82 before the floor latches the release.

Initial activation of the pull strap 23 causes the seat back alone to dump. The drive pin 84 contacts the interlock arm 86 upon forward rotation of the seat back. This causes the interlock arm 86 to rotate. When this occurs, the interlock lever 82 moved. This allows the pin on the front gear 76 to rotate clear of the interlock lever 82.

It will be appreciated that the disclosed invention is well-suited for deployment so that it can be used by an occupant in the second or third row of a vehicle.

As used herein, an actuator includes a gear assembly. A suitable gear case assembly is available from Lear Corporation located in Southfield, Mich. (e.g., Lear part number L0023481AA).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for a vehicle, the assembly including:
    a seat back that is moveable through an arcuate range, the seat back being moveable between a design position in which it may support an occupant and a fold flat position;
    one or more seat back latches that are operatively connected to the seat back for releasably securing the seat back in the design position;
    a seat cushion that supports the seat back, the seat cushion having a rearward portion that cooperates with the seat back, the seat cushion having one or more associated floor latches, the seat cushion having a forward portion that is pivotally attached to the floor so that the seat cushion and seat back may tumble forwardly when the seat back latches are disengaged, the seat back lies in the fold flat position and the floor latches are disengaged to facilitate occupant ingress and egress; and
    a release system associated with the one or more seat back and floor latches for releasing the one or more seat back and floor latches, the release system comprising a front gear, a rear gear and a release strap that extends from the seat back.

2. The seat assembly of claim 1, wherein the release system also includes a lever that cooperates with the one or more seat back and floor latches, the floor strap actuating the lever, thereby dumping the seat back and tumbling the seat back and cushion.

3. The seat assembly of claim 1, wherein the release strap has an anchored end that is secured to a seat frame member.

4. The seat assembly of claim 2, wherein the release system also includes a lower guide roll over which the release strap passes, the lower guide roll extending from a one end region of a lever so that when the release strap is pulled, the end region is displaced.

5. The seat assembly of claim 4, wherein the release system also includes an upper guide roll that extends from a seat frame member, the release strap extending between the lower and upper guide rolls.

6. The seat assembly of claim 5, wherein the release system also includes a shaft having a rear gear that is keyed with the shaft, the lever also being keyed to the shaft so that rotation of the rear gear causes an arcuate displacement of an end region of the lever.

7. The seat assembly of claim 6 further including a front gear that engages the rear gear so that sufficient rotation of the front gear causes rotation of an arm which in turn actuates a cable that releases the floor latches and causes the seat assembly to assume a tumbled position.

8. A method for releasing a seat assembly in a vehicle so that the seat assembly may have a seat back that pivots toward a full fold flat position in relation to a seat cushion and the seat cushion and seat back may in combination tumble forwardly about a forward portion of the seat cushion, the method comprising steps of:

provide one or more seat back latches that are operatively connected to a seat assembly for releasably securing the seat back in a design position;

positioning a seat cushion to support the seat back and providing the seat cushion with one or more associated floor latches for engaging the floor of the vehicle;

pulling on a release strap extending from the seat back, that activates a release system including a front gear and a rear gear associated with the one or more seat back and floor latches, so that upon actuating the release system, the seat back falls forwardly and the seat cushion and seat back in combination tumble forwardly, thereby facilitating occupant ingress and egress while providing improved access to luggage and stowage spaces.

* * * * *